United States Patent [19]
Dick

[11] 4,249,232
[45] Feb. 3, 1981

[54] HEADLAMP, PARTICULARLY FOR MOTOR VEHICLES

[75] Inventor: Heinz Dick, Odenthal, Fed. Rep. of Germany

[73] Assignee: Ford Motor Company, Dearborn, Mich.

[21] Appl. No.: 920,566

[22] Filed: Jun. 29, 1978

[30] Foreign Application Priority Data

Jul. 21, 1977 [DE] Fed. Rep. of Germany ....... 2732895

[51] Int. Cl.³ .............................................. B60Q 1/06
[52] U.S. Cl. ..................................... 362/61; 362/267; 362/277; 362/294
[58] Field of Search ................. 362/61, 267, 277, 306, 362/307, 308, 311, 319, 322, 294, 80, 406, 418, 427, 428, 429, 430, 434

[56] References Cited

FOREIGN PATENT DOCUMENTS

| | | |
|---|---|---|
| 1005465 | 4/1957 | Fed. Rep. of Germany ........... 362/277 |
| 1605914 | 2/1971 | Fed. Rep. of Germany ........... 362/311 |
| 2333106 | 6/1973 | Fed. Rep. of Germany ............. 362/61 |
| 2361724 | 6/1975 | Fed. Rep. of Germany ............. 362/61 |
| 2457292 | 6/1975 | Fed. Rep. of Germany ........... 362/277 |
| 1211038 | 10/1959 | France ..................................... 362/277 |
| 549160 | 10/1956 | Italy ........................................ 362/277 |
| 216834 | 11/1967 | Sweden ................................... 362/277 |

*Primary Examiner*—L. T. Hix
*Assistant Examiner*—Alan Mathews
*Attorney, Agent, or Firm*—Peter Abolins; Clifford L. Sadler

[57] ABSTRACT

This specification discloses a headlamp for motor vehicles and the like which includes a spacer or distance part between the front glass and the reflector. The distance part is formed as a mounting member carrying fasteners for mounting the headlamp unit in a body opening. The distance part is connected to the reflector by a pivotally movable ring assembly and the distance part carries adjustment means acting on the reflector. This headlamp design avoids gaps at the junction of the front glass and the body opening and offers the advantages of headlamps of the semi sealed beam type and headlamps with front glasses fixed to the body.

1 Claim, 10 Drawing Figures

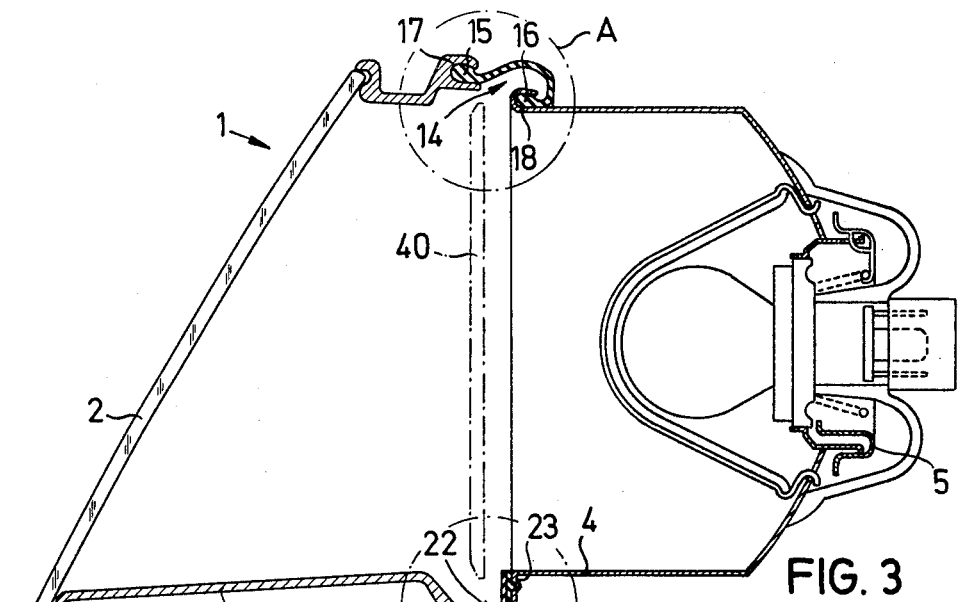
FIG. 3
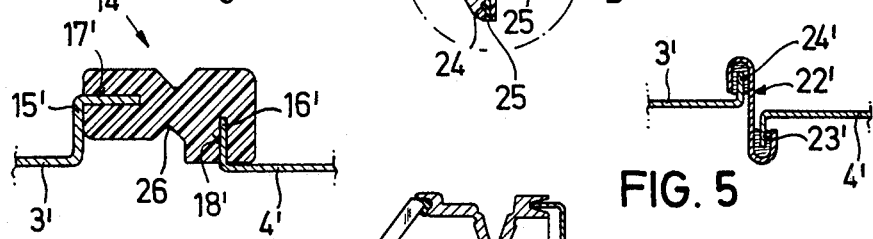
FIG. 4
FIG. 5
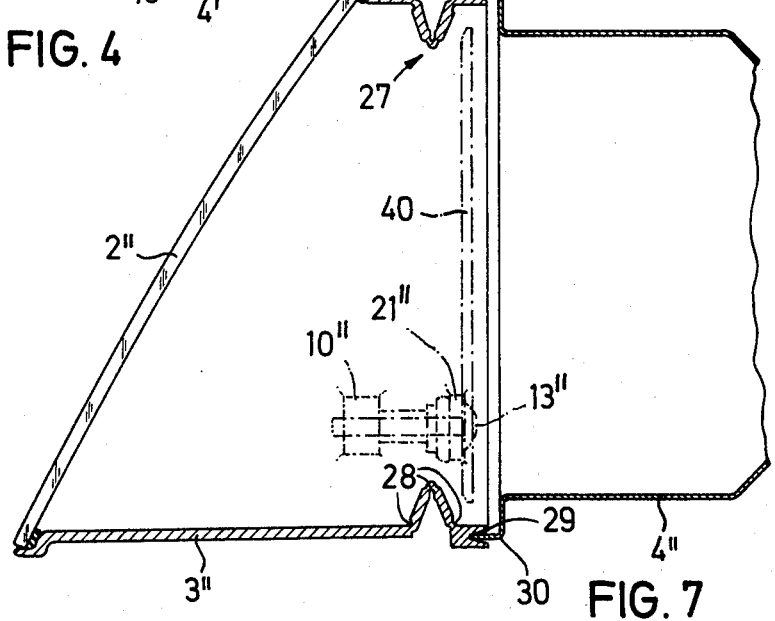
FIG. 7

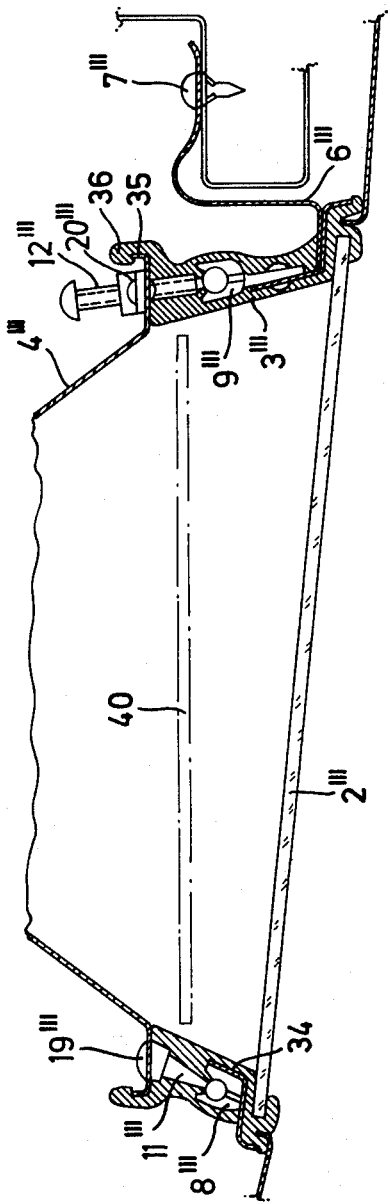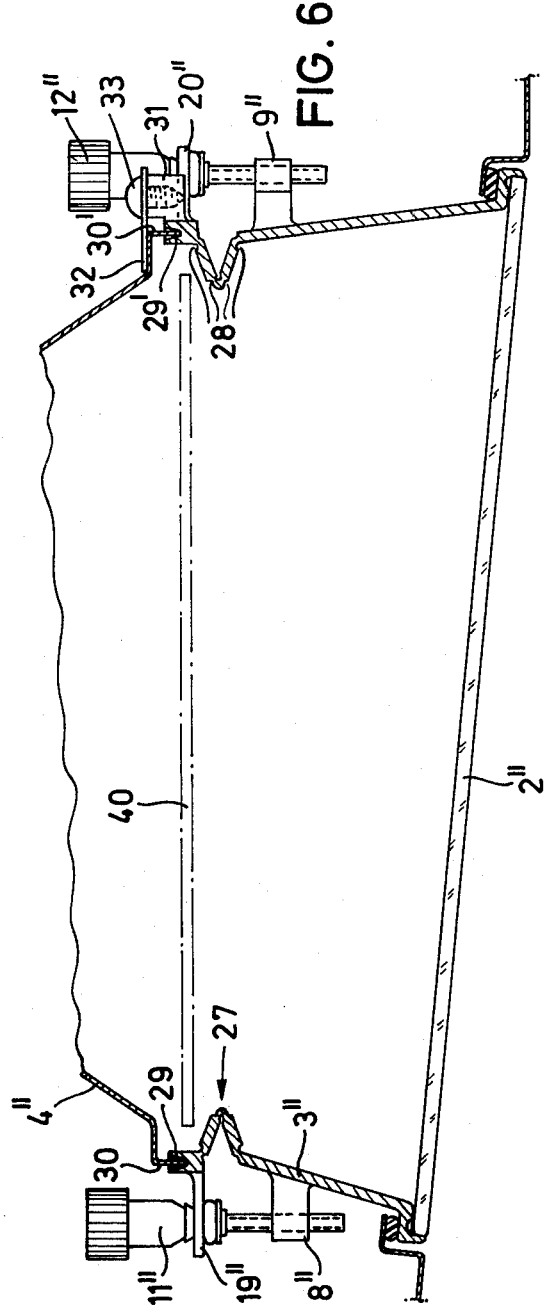

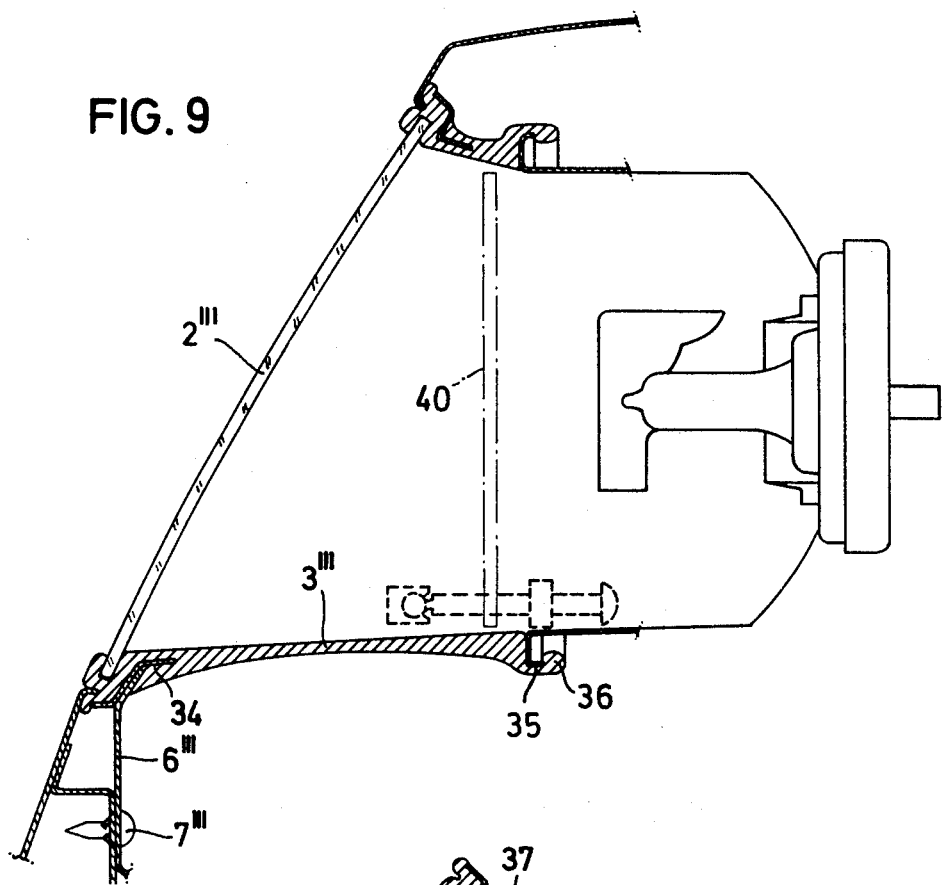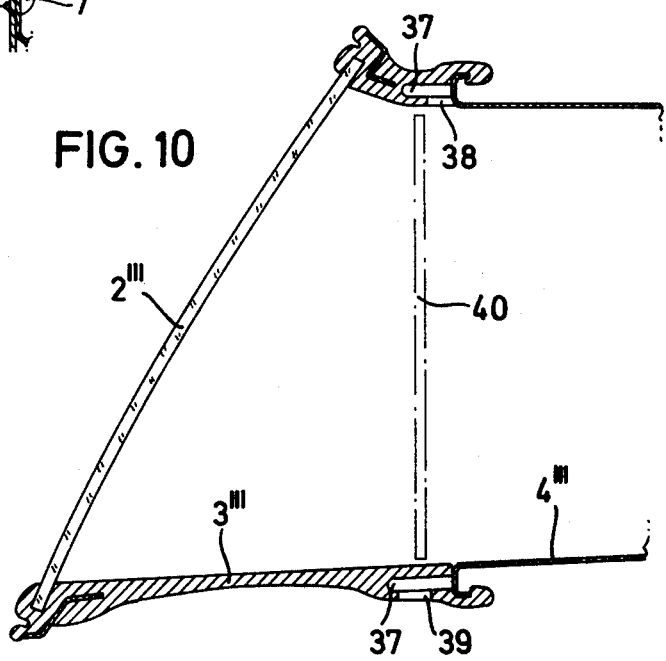

HEADLAMP, PARTICULARLY FOR MOTOR VEHICLES

BACKGROUND OF THE INVENTION

(1) Field of the Invention

This invention relates to headlamps and, in particular, to the structure of the headlamps.

(2) Prior Art

Prior art, such as German AS No. 1 605 914, teaches a headlamp unit intended to satisfy different requirements at the least possible production cost outlay. One of these requirements is a headlamp shape which as far as possible adapts itself to the aerodynamically designed front end of the bodywork, and the other requirement is the maintenance of good lighting performance.

Although the requirements imposed are satisfied by the proposed German structure of the headlamp unit, at the expense of relatively low manufacturing outlay, the known headlamp unit also exhibits serious drawbacks. These drawbacks reside in the fact that in order to adjust the beam of the headlamp, the entire headlamp unit, which has a relatively large installed volume, has to be pivoted. Consequently, correspondingly robustly designed attachment means and adjustor devices have to be provided on the bodywork and once again unwanted deviations on the part of the surface of the headlamp lens, from the surrounding bodywork contour, have to be accepted.

In order to avoid these drawbacks, it has been proposed for example in German published patent application No. 2 457 292, that a sealed headlamp unit should be fixed to the bodywork and the requisite adjustment of the beam of the headlamp performed by adjustment of an inner headlamp, arranged inside the headlamp housing and consisting of a partial reflector and an auxiliary diffuser lens attached thereto, which inner headlamp is adjustably mounted in the headlamp housing.

However, the basic design premise underlying a semisealed beam unit, namely that of low manufacturing cost, is departed from and once again the known design reverted to (this requiring a substantially larger manufacturing outlay) in which a supporting frame fixed to the bodywork carries the headlamp reflector in an adjustable relationship and is sealed at the front by the glass lens attached to it and at the rear by a housing likewise attached to it. These are some of the problems this invention overcomes.

SUMMARY OF THE INVENTION

The present invention relates to a headlamp, in particular for motor vehicles, which forms a closed headlamp unit, normally referred to as a semisealed beam unit, consisting of a substantially symmetrical reflector, an asymmetrical spacer attached to the latter and extending the reflector forwards, and a glass lens attached to the latter.

In accordance with an embodiment of this invention, the above described drawbacks of the prior art are avoided while maintaining a desirably low manufacturing cost. By designing the spacer as a carrier with fixing elements to secure the headlamp unit in a bodywork opening (e.g., an opening in the body sheet metal), the reflector being attached to the carrier in a sealed fashion through a pivoting ring arrangement, and by arranging aduster devices on the spacer and engaging the reflector, the following advantages are secured: the extremely heavy component which, in particular in a vehicle with a front end which aerodynamically designed, results from the steeply sloped and correspondingly large and heavy glass lens and the correspondingly bulky spacer, can be fixed to the bodywork through simple, correspondingly strongly designed mountings, while the substantially lighter component constituted by the reflector and the bulb socket, can be supported on the one hand through the ring arrangement in accordance with the invention and on the other hand through correspondingly more simply designed adjuster devices.

The drawback occurring in known closed headlamp units, namely that despite the provision of adjuster devices which have substantial dimensional margins, the high weight of the headlmap unit and the numerous vibrations occurring in a motor vehicle, lead repeatedly to the need to adjust the regulation setting of the beam of the headlamp, is reliably avoided by the headlamp of the invention.

Where the pivoting ring arrangement proposed in accordance with the invention is concerned, this being the arrangement through which the spacer is attached in sealed fashion to the headlamp reflector, a plurality of embodiments are possible, some of which have been illustrated in the drawings purely by way of example. For the attachment of the spacer to the pivoting ring arrangement and of the latter itself to the reflector, connecting techniques conventionally employed in the manufacture of headlamps can be used.

In two particularly advantageous embodiments of a headlamp in accordance with the invention, the pivoting ring arrangement is formed integrally with a spacer or synthetic material so that only one joint, between the spacer and the reflector, requires sealing.

In one embodiment, the spacer consists of relatively stiff synthetic material and has mountings formed directly in situ in it, for the fixing elements and the adjuster devices, and is provided adjacent the reflector flange with a circumferential annular crease containing points of articulation, this giving the reflector the facility to pivot vis-a-vis the spacer.

In the other embodiment, the spacer consists of largely elastic synthetic material e.g., foam synthetic material, and accommodates a supporting frame, of sheet metal or a rigid synthetic material, equipped with mountings for the fixing elements and the adjuster devices, in an integrally foamed arrangement. A special annular crease in the wall of the spacer is not required here because the elasticity of the material of which the spacer is made enables the reflector to be pivotally adjusted in relation to the spacer.

In the case of the headlamps in accordance with the invention as illustrated, these having relatively steeply sloping glass lenses, the provision of a diffuser lens or auxiliary diffuser lens of synthetic material, as for example disclosed in German Pat. No. AS 2 333 106, within the headlamp, offers particular advantages.

BRIEF DESCRIPTION OF THE DRAWINGS

FIG. 3 is a vertical sectional view along the line 3—3 of FIG. 1;

FIG. 4 is a further embodiment of a pivoting ring arrangement similar to the embodiment circled A in FIGS. 2 and 3;

FIG. 5 is a further embodiment of a pivoting ring arrangement similar to the circled B in FIGS. 2 and 3;

FIG. 6 is a horizontal part-sectional view similar to FIG. 2, through an embodiment with a pivoting ring arrangement integrated into a spacer of synthetic material;

FIG. 7 is a vertical part-sectional view similar to FIG. 3, through the embodiment of FIG. 6;

FIG. 8 is a horizontal part-sectional view similar to FIG. 2, through a further embodiment with a spacer of elastic synthetic material;

FIG. 9 is a vertical part-sectional view similar to FIG. 3, through the embodiment of FIG. 8; and FIG. 10 is a vertical part-sectional view similar to FIG. 9, through a ventilating device integrated into the spacer of elastic synthetic material.

DETAILED DESCRIPTION

Figure 1:
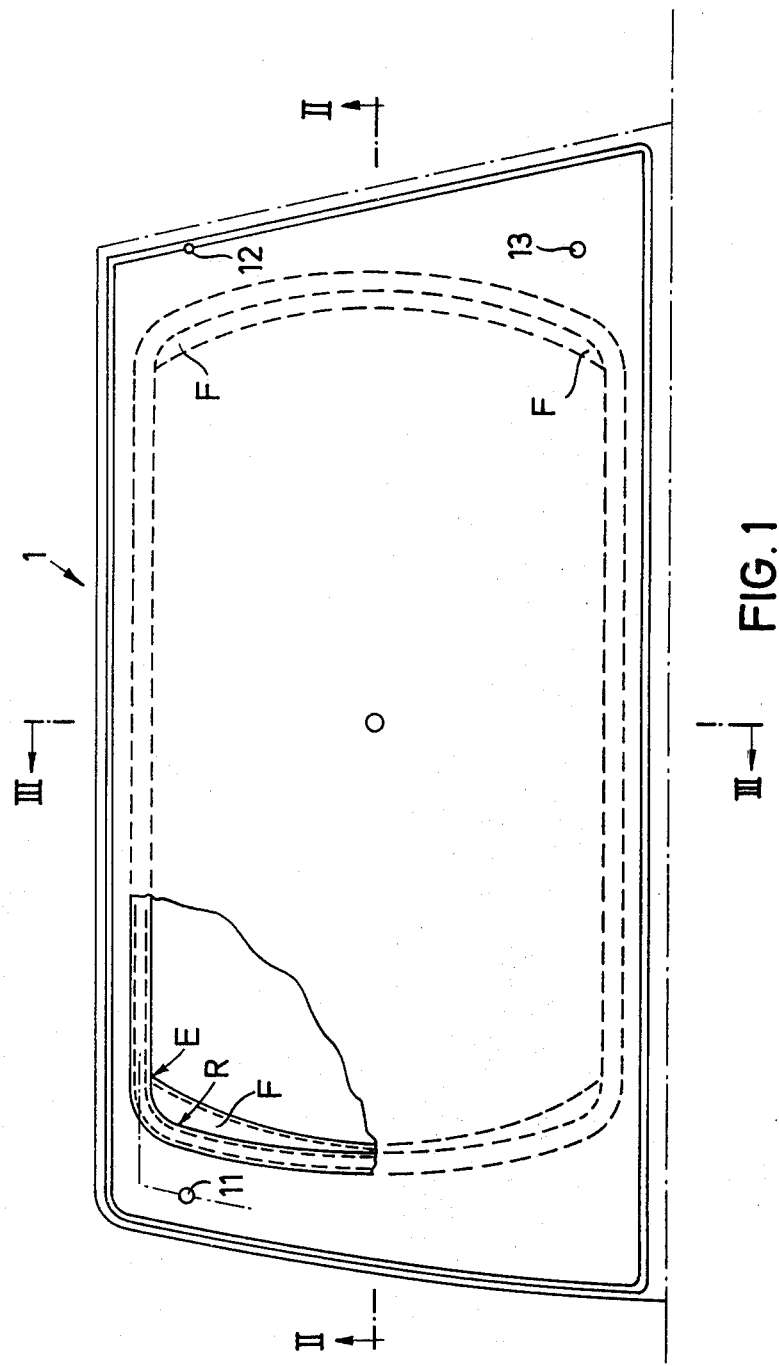
FIG. 1 is a front elevation view of a headlamp unit in accordance with an embodiment of this invention.

From the front elevation shown in FIG. 1, essentially only the positions of the sections and the position of the adjuster devices are to be seen. In the sections shown in FIGS. 2 and 3, in the circles A and B in each case two different embodiments of a pivoting ring arrangement in accordance with the invention have been shown. It goes without saying that in an actual headlamp unit, in each case only one embodiment of a pivoting arrangement in the form of a circumferential component of substantially uniform cross-section, will be used.

A headlamp unit 1 in accordance with the invention consists essentially of a first, relatively heavy component formed by a glass lens 2 and a spacer 3, and a second, relatively light component formed by a reflector 4 and a lamp socket 5 with the associated components. The first, heavy component is here united with the second, light component in a sealed fashion through a pivoting ring arrangement in accordance with the invention of the kind shown either in circle A or circle B. The first, heavy component is here attached firmly to the bodywork through corresponding mountings 6 and fixing elements 7, while the second, lighter component is adjustably mounted through adjuster devices 11, 12 and 13 arranged in mountings 8, 9 and 10 on the heavy component, which devices engage the reflector 4.

When a spacer 3 is formed of sheet metal, mountings 6, 8, 9 and 10 can be attached by riveting or spot welding, but when a spacer 3 made of low-elasticity synthetic material, they will preferably be formed integrally with it.

In the embodiment shown in circle A (FIGS. 2 and 3), the pivoting ring arrangement 14 consists of a circumferential ring of elastic material which has an S-shaped cross-section or a kind of rolled bellows shape. The thickened end beads 15 and 16 of the ring arrangement 14 are accepted in circumferential locating grooves 17 and 18 which are formed on the one hand in spacer 3 and on the other in reflector 4. In ring arrangement 14 shown in circle A, end beads 15 and 16 can be attached firmly and in sealed fashion to spacer 3 and to reflector 4 respectively, on the one hand by hot-sealing and on the other hand by hammering them in.

Referring to FIG. 1, to avoid the relatively sharp corners E (in rectangular headlamps with correspondingly flattened reflectors) which would militate against reliable sealing, a step is formed in the reflector diameter zone so that at the corner area a radius R more suitable for sealing is created. The area F created in this way is available for the attachment of the parts 19, 20 and 21 engaging the reflector of adjuster devices 11, 12 and 13.

In the embodiment shown in circle B (FIGS. 2 and 3), the pivoting ring arrangement consists of a circumferential, substantially flat diaphragm strip 22 of elastic synthetic material or spring sheet metal. The diaphragm strip 22 is here attached in a sealed fashion, through a conventional hot-sealing compound 25 of the kind employed in headlamp construction, to a correspondingly designed flange 23 of reflector 4 and a corresponding flange 24 on spacer 3. The central area of the diaphragm strip 22 is here so designed, for example using stamped-in locations at which bending can take place, that reflector 4 has adequate facility to pivot in relation to spacer 3 which is secured to the bodywork.

Figure 2:
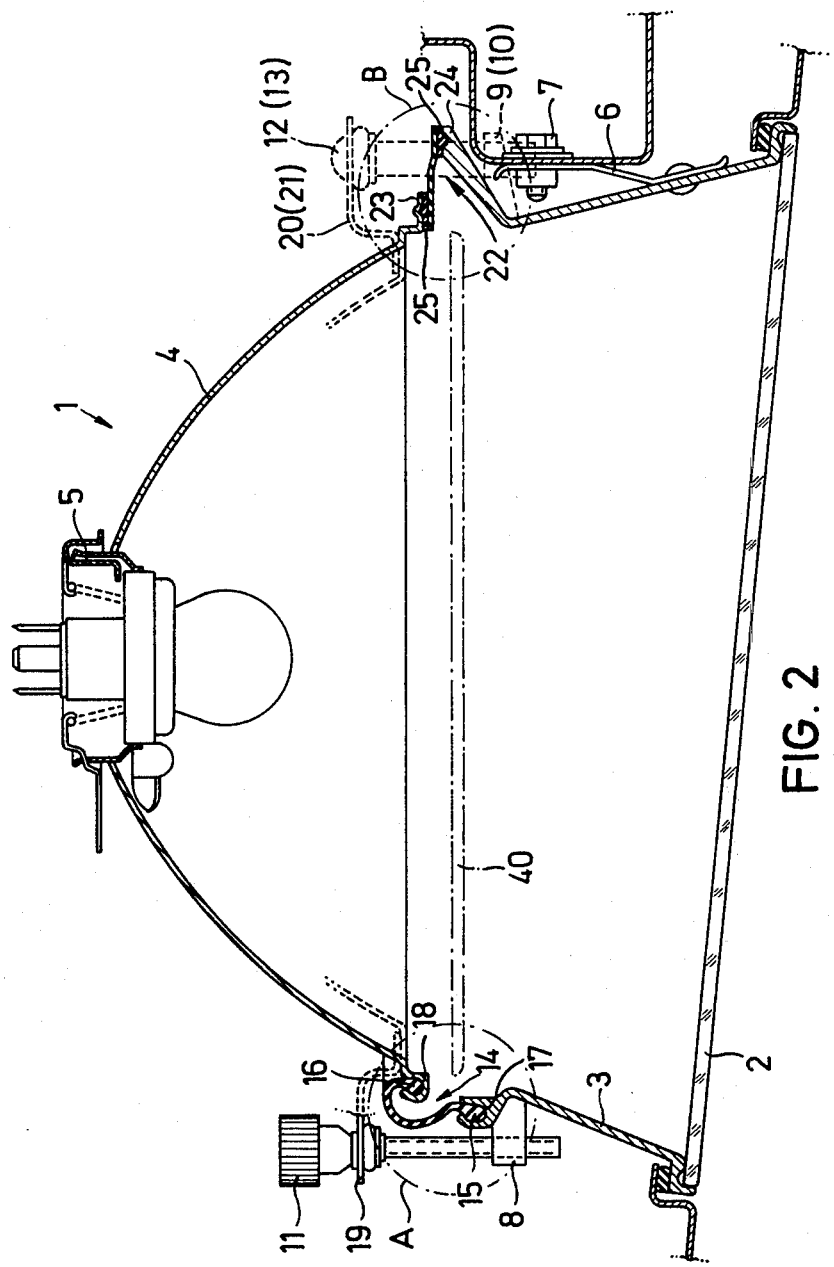
FIG. 2 is a horizontal sectional view along the line 2—2 of FIG. 1.

In FIGS. 4 and 5, sectional views through additional embodiments of a pivoting ring arrangement in accordance with the invention have been shown, and components which correspond in function with similar components already shown in FIGS. 1 to 3, have been marked by the same reference numbers except for the provision of an apostrophe.

In FIG. 4, a pivoting ring arrangement 14' can be seen likewise designed as a circumferential ring of elastic synthetic material. The ring arrangement 14' here exhibits circumferential locating grooves 17' and 18' into which circumferential flanges 15' and 16' on a spacer 3' and a reflector 4' project and are for example stuck into place. The ring arrangement 14' is here provided with a circumferential waisted zone 26 which provides the requisite facility for pivoting.

In FIG. 5, a pivoting ring arrangement 22' has been shown once again consisting of a substantially flat diaphragm strip. In this case, however, the diaphragm strip is attached to the corresponding flanges 23' and 24' on spacer 3' and reflector 4', by a crimping operation. Self-evidently, in the manner conventionally employed in sheet metal crimping operations, a corresponding metal adhesive can be provided in the neighborhood of the crimped zone which ensures that the crimped connection is fluidtight. Here, again, the free length of the diaphragm strip 22' as well as the thickness and the elasticity must be so designed that the requisite facility for pivoting is ensured.

In FIGS. 6 and 7, a further embodiment of a headlamp unit in accordance with the invention has been shown in which the pivoting ring arrangement is formed integrally with a spacer of synthetic material. For comparable components, here again, the same references have been used except for the provision of a double apostrophe, and it is substantially only the modification which is discussed.

In this embodiment, a spacer 3" connected to a glass lens 2" consists of low-elasticity synthetic material and has a pivoting ring arrangement in the form of a circumferential, integrally formed annular crease 27. The annular crease 27 is attached to the neighboring walls through circumferential locations 28 at which bending is designed to take place. That end of spacer 3" which is located towards a reflector 4" is provided with a circumferential locating groove 29 into which a corresponding flange 30 on reflector 4' projects and is secured there in sealed fashion by an adhesive or by hot-sealing. In this embodiment, mountings 8", 9" and 10" required for adjuster devices 11", 12" and 13", and engaging components 19'', 20'' and 21'', are formed directly and integrally in spacer 3''.

The reflector 4'' can be attached not merely by the use of adhesive, as shown in the lefthand side of FIG. 6, but also, as shown on the righthand side of FIG. 6, can be forced by screws 33 into the conical groove 29', at the mounting 31 on spacer 3'' and the lug 32 on the reflector 4'', in such a fashion that the flange 30' is sealed.

In FIGS. 8 and 9, a further embodiment of a headlamp unit in accordance with the invention has been shown, in which the spacer consists of elastically soft synthetic material, e.g., foam material, and has the pivoting ring arrangement formed integrally in it. Here, again, corresponding components have been given the same references, except for the provision of a triple apostrophe.

A spacer 3''' consisting of elastically soft synthetic material, accepts a glass lense 2''' in a conventional fashion in a circumferential locating groove. In spacer 3''' of elastically soft material, a circumferential supporting frame 34 is formed in situ, on which mountings 6''' for the attachment of spacer 3''' through fixing elements 7''' to the bodywork, are arranged.

On the supporting frame 34, which may consist of sheet metal or a harder synthetic material, corresponding mountings 8''', 9''', etc., for the adjuster devices 11''' and 12''', etc., are arranged on the reflector 4''. The adjuster devices 11''', 12''', etc., will conveniently be so designed that they can be formed directly in situ at the time of manufacture of spacer 3''' and subsequently engaged, at the time of assembly, with corresponding parts of reflector 4'''. The sealing of the connection between spacer 3''' and reflector 4''' here conveniently takes place in the form of an elastic, circumferential bead 36 at the rear end of spacer 3''', which bead is buttoned onto a rearwardly angled, circumferential collar 35 on the reflector 4'''. Self-evidently, if required, this arrangement can be supplemented by an adhesive connection as well.

In FIG. 10, a further convenient measure for application to a headlamp unit in accordance with the invention has been shown. In spacer 3''' of elastically soft synthetic material, in this case at that end adjoining reflector 4''', a circumferential ventilation passage 37 is formed which communicates through an upper opening 38 with the interior of the headlamp and through a lower opening 39 with the atmosphere. In contrast to known ventilation devices (as for example disclosed in German published patent application No. 23 61 724), the ventilation passage 37 follows the reflector rim and makes it possible to arrange the opening 38 at the topmost point of the headlamp while the opening 39 is located at the lowest point thereof. Accordingly, the relatively large headlamp volume has a correspondingly large ventilation passage available so that rapid air exchange can take place at low flow velocities while reliably preventing the ingress of spashwater into the headlamp interior.

In the various Figures, substantially at the zone of transition from the reflector to the spacer, a diffuser lens 40 shown in chain-dotted line has been illustrated. The arrangement of this kind of diffuser lens within a headlamp is already known, and this has been mentioned introductorily (German Pat. No. AS. 23 33 106). However, it should be pointed out here that in a headlamp unit in accordance with the invention particularly favorable conditions for the provision of this kind of diffuser lens exist because this can be attached through correspondingly designed slots or in locating grooves in the spacer which is made of synthetic material.

Self-evidently, in the case of a spacer made of foam material, this foam component is formed with a closed external skin which, depending upon stylistic requirements, can be painted or given a vapor-deposited aluminum finish.

Various modifications and variations will no doubt occur to those skilled in the various arts to which this invention pertains. For example, the headlamp unit in accordance with the invention can be used just as conveniently for headlamps having a substantially vertical glass lens. These and all other variations which basically rely on the teachings through which this disclosure has advanced the art are properly considered within the scope of this invention.

I claim:

1. A headlamp for motor vehicles, which forms a closed headlamp unit comprising a substantially symmetrical reflector, an asymmetrical spacer attached to said reflector and extending forward of said reflector, and a glass lens attached to said spacer, characterized in that said spacer is designed as a carrier having attachment means for securing said headlamp unit in a body opening, and is attached to said reflector in sealed fashion by means of a pivoting ring arrangement; and the end of said spacer which is disposed toward said reflector including an air supply passage extending around the whole circumference of said headlamp, said air supply passage being in situ formed, said air supply passage communicating through a first opening with the interior of said headlamp and through a second opening, with the outside atmosphere.

* * * * *